(12) United States Patent
Bose et al.

(10) Patent No.: US 7,886,172 B2
(45) Date of Patent: Feb. 8, 2011

(54) METHOD OF VIRTUALIZATION AND OS-LEVEL THERMAL MANAGEMENT AND MULTITHREADED PROCESSOR WITH VIRTUALIZATION AND OS-LEVEL THERMAL MANAGEMENT

(75) Inventors: Pradip Bose, Yorktown Heights, NY (US); Chen-Yong Cher, Port Chester, NY (US); Hubertus Franke, Cortlandt Manor, NY (US); Hendrik Hamann, Yorktown Heights, NY (US); Eren Kursun, Ossining, NY (US); Alan J. Weger, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 11/845,243

(22) Filed: Aug. 27, 2007

(65) Prior Publication Data

US 2009/0064164 A1    Mar. 5, 2009

(51) Int. Cl.
*G06F 1/32* (2006.01)
(52) U.S. Cl. .................. 713/324; 713/300; 713/320
(58) Field of Classification Search .......... None
See application file for complete search history.

(56) References Cited

U.S. PATENT DOCUMENTS

| | | | |
|---|---|---|---|
| 6,804,632 B2 | 10/2004 | Orenstien et al. | |
| 6,934,658 B2 | 8/2005 | Clabes et al. | |
| 7,086,058 B2 | 8/2006 | Luick | |
| 7,389,403 B1 * | 6/2008 | Alpert et al. | 712/10 |
| 2002/0065049 A1 | 5/2002 | Chauvel et al. | |
| 2003/0110012 A1 | 6/2003 | Orenstien et al. | |
| 2004/0128663 A1 | 7/2004 | Rotem | |
| 2005/0216222 A1 | 9/2005 | Inoue | |
| 2005/0216775 A1 | 9/2005 | Inoue | |
| 2005/0278520 A1 | 12/2005 | Hirai et al. | |
| 2006/0031836 A1 | 2/2006 | Brown et al. | |
| 2006/0070073 A1 | 3/2006 | Maeda et al. | |
| 2006/0095911 A1 | 5/2006 | Uemura et al. | |

(Continued)

FOREIGN PATENT DOCUMENTS

EP        1655655 A    10/2006

(Continued)

OTHER PUBLICATIONS

Skadron, et al. "Temperature Aware Architecture: Modeling and Implementation," ACM Transactions on Architecture and Code Optimization, pp. 94-125, Mar. 2004.

(Continued)

*Primary Examiner*—Dennis M Butler
(74) *Attorney, Agent, or Firm*—Law Office of Charles W. Peterson, Jr.; Brian P. Verminski, Esq.

(57) ABSTRACT

A program product and method of managing task execution on an integrated circuit chip such as a chip-level multiprocessor (CMP) with Simultaneous MultiThreading (SMT). Multiple chip operating units or cores have chip sensors (temperature sensors or counters) for monitoring temperature in units. Task execution is monitored for hot tasks and especially for hotspots. Task execution is balanced, thermally, to minimize hot spots. Thermal balancing may include Simultaneous MultiThreading (SMT) heat balancing, chip-level multiprocessors (CMP) heat balancing, deferring execution of identified hot tasks, migrating identified hot tasks from a current core to a colder core, User-specified Core-hopping, and SMT hardware threading.

20 Claims, 11 Drawing Sheets

U.S. PATENT DOCUMENTS

2007/0074011 A1* 3/2007 Borkar et al. ............... 712/227
2007/0150895 A1 6/2007 Kurland
2008/0022076 A1* 1/2008 Krieger et al. .............. 712/220
2008/0134191 A1* 6/2008 Warrier et al. .............. 718/104

OTHER PUBLICATIONS

Seongmoo, et al. "Reducing Power Density Through Activity Migration," Proceedings of the 2003 International Symposium on Low Power Electronics and Design, Aug. 2003.

Rusu, et al. "Energy Efficient Real Time Heterogeneous Server Clusters," Source: In Workshop on Power Aware Computer Systems (PACS '02).

PCT ISR Oct. 24, 2008.

James Donald et al., "Techniques for Multicore Thermal Management: Classification and New Exploration," Proceedings of the 33rd International Symposium on Computer Architecture (ISCA '06), pp. 78-88, Jun. 17-21, 2006.

\* cited by examiner

| | VARIABILITY MATRIX | | | | | |
|---|---|---|---|---|---|---|
| | PERFORMANCE COUNTERS | AVERAGE TEMPERATURE (DEGREES C) | MAXIMUM TEMPERATURE (DEGREES C) | | | |
| | INSTRUCTIONS-PER-CYCLE | EXECUTION UNIT UTILIZATION | CORE 0 | CORE 1 | CORE 0 | CORE 1 |
| TASK 1 | 0.9 | 0.6 | 50 | 60 | 70 | 90 |
| ... | | | | | | |
| TASK M | 0.7 | 0.4 | 35 | 47 | 50 | 60 |

Fig. 9

| 230 | | PROXIMITY HEATING MATRIX | | | | | |
|---|---|---|---|---|---|---|---|
| | PERFORMANCE COUNTERS | AVERAGE TEMPERATURE (DEGREES C) | MAXIMUM TEMPERATURE (DEGREES C) | | | | |
| | INSTRUCTIONS-PER-CYCLE | EXECUTION UNIT UTILIZATION | CORE 0 | CORE 1 | CORE 0 | CORE 1 |
| TASK 1 | 0.9 | 0.6 | | +4 | | +5 |
| ... | | | | | | |
| TASK M | 0.7 | 0.4 | | +6 | | +8 |

Fig. 10

METHOD OF VIRTUALIZATION AND OS-LEVEL THERMAL MANAGEMENT AND MULTITHREADED PROCESSOR WITH VIRTUALIZATION AND OS-LEVEL THERMAL MANAGEMENT

BACKGROUND OF THE INVENTION

1. Field of the Invention

The present invention generally relates to heat management in Integrated Circuit (IC) chips and more particularly to reducing power hotspots in a Simultaneous MultiThreaded (SMT) IC chips, such as an SMT processor or microprocessor.

2. Background Description

Semiconductor technology and chip manufacturing advances have resulted in a steady increase of on-chip clock frequencies, the number of transistors on a single chip and the die size itself. Thus, not withstanding the decrease of chip supply voltage, chip power consumption has increased as well. Further, this power consumption is concentrated into increasingly smaller chip areas that may, from time to time, result in local chip hotspots. Also, chip current leakage (i.e., lost/wasted energy) increases exponentially with increasing temperatures. So, these increased peak and average temperatures can waste chip energy and shorten chip and system lifetimes as well. It has been shown that electrical circuit lifetime may be cut in half, when the operating temperature increases by 10-15 degrees Celsius. Consequently, increased on-chip peak temperatures increase chip cooling and packaging cost to maintain operating temperatures at optimum levels. This corresponds to escalating chip and system level cooling and packaging costs.

Dynamic thermal management (DTM) techniques have been employed in the past, as a hardware solution to limit peak temperatures, especially on state of the art microprocessors. DTM techniques throttle back chip performance, to lower power consumption when the chip reaches a preset temperature threshold. A variety of actuating responses are available to effect such throttling, e.g., global clock gating, clock-throttling, voltage and/or frequency scaling. However, these drastic hardware throttling measures can severely degrade performance for a class of very high performance applications.

A scalar processor fetches and issues/executes one instruction at a time. Each such instruction operates on scalar data operands. Each such operand is a single or atomic data value or number. Pipelining is an approach to maximizing processor performance, wherein processor chip logic is bounded by pairs of register stages with multiple pairs forming the pipeline. Logic between each pair of stages may be operating independently on a different operand than logic between other pairs. A series of operands or low level operations forming a higher level operand traversing the pipeline may be in what is known as a thread. A hotspot may occur at a pipeline stage, for example, by vigorously exercising logic in that stage. For example a shift and add multiplier may involve repeated adding, cycle after cycle, for 32, 64 or more cycles, and can cause a hotspot at the adder.

A superscalar processor can fetch, issue and execute multiple instructions in a given machine cycle, each in a different execution path or thread, in what is also referred to as Simultaneous Multi-Threading (SMT). Each instruction fetch, issue and execute path is usually pipelined for further, parallel concurrency. Examples of superscalar processors include the Power/PowerPC processors from IBM Corporation, the Pentium processor family from Intel Corporation, the Ultrasparc processors from Sun Microsystems and the Alpha processor and PA-RISC processors from Hewlett Packard Company (HP). State of the art superscalar microprocessors utilize SMT on multiple cores on a chip (e.g., Chip-level MultiProcessors (CMP)).

These state of the art superscalar microprocessors present new perspectives for thermal management using task scheduling and migration in system-level software such as Operating System (OS) and the virtualization layer (also known as the Hypervisor). Core-hopping, for example, involves migrating a hot task (as determined by a local temperature sensor) between multiple cores, and has proven an effective state of the art mechanism for reducing peak temperatures. However, core-hopping requires the availability of colder, idle cores as hot task destinations. State of the art systems typically are loaded or over-loaded such that idle destination cores are unavailable.

While distributing the power consumption more evenly across a CMP mitigates thermal dissipation without compromising performance, it also reduces static design choices. Evenly distributing the power consumption requires relatively simple cores (and more cores per die/chip), based on thermal-aware floor planning. However, restricting chips to numerous simple cores located for thermal-awareness fails to deal with and exploit workload variability.

Thus, there is a need for improved dynamic redistribution of CMP chip power located to meet power and thermal envelope requirements and without reducing chip performance.

SUMMARY OF THE INVENTION

It is therefore a purpose of the invention to improve processor performance;

It is another purpose of the invention to minimize hotspots in Simultaneous MultiThreaded (SMT) processors;

It is yet another purpose of the invention to minimize SMT processor performance loss from the occurrence of hotspots in processor cores.

The present invention is related to a program product and method of managing task execution on an integrated circuit chip such as a chip-level multiprocessor (CMP) with Simultaneous MultiThreading (SMT). Multiple chip operating units or cores have chip sensors (temperature sensors or counters) for monitoring temperature in units. Task execution is monitored for hot tasks and especially for hotspots. Task execution is balanced, thermally, to minimize hot spots. Thermal balancing may include Simultaneous MultiThreading (SMT) heat balancing, chip-level multiprocessors (CMP) heat balancing, deferring execution of identified hot tasks, migrating identified hot tasks from a current core to a colder core, User-specified Core-hopping, and SMT hardware threading.

The preferred thermal management method is applicable to a multi-threaded, multiprocessor computer system through software, OS or Virtualization task scheduling, e.g., using power management knobs. The system reduces peak chip temperature to below a preset value and lowers average chip temperature for reduced energy leakage. The system leverages priority information available on state of the art microprocessors to the OS and Virtualization layer, using advanced power management techniques such as dynamic voltage and frequency scaling, clock-gating and power-gating, along with switching workload activity. A task may be identified as hot from dynamically measured proxies such as thermal sensors or performance counters, as specified by a user or through task profiling. Performance or utilization counters can be used with SMT to determine the heat contribution of each simultaneously running task. User-specified actions may specify thermal-aware core-hopping based on timer or sensors. Existing concurrent task scheduling and load-balancing techniques may be leveraged to consider thermal characteristics in load balancing, thereby reducing thermal-scheduling overhead and chip temperatures. Also, the allowed number of hardware threads may be reduced on an SMT to reduce chip temperatures.

Running different workloads on the same core can result in significant differences in temperatures for different execution units. In some systems, cores or execution units might have different functionality (heterogeneity) or have same functionality but differences in heating characteristics due to manufacturing and design variability.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
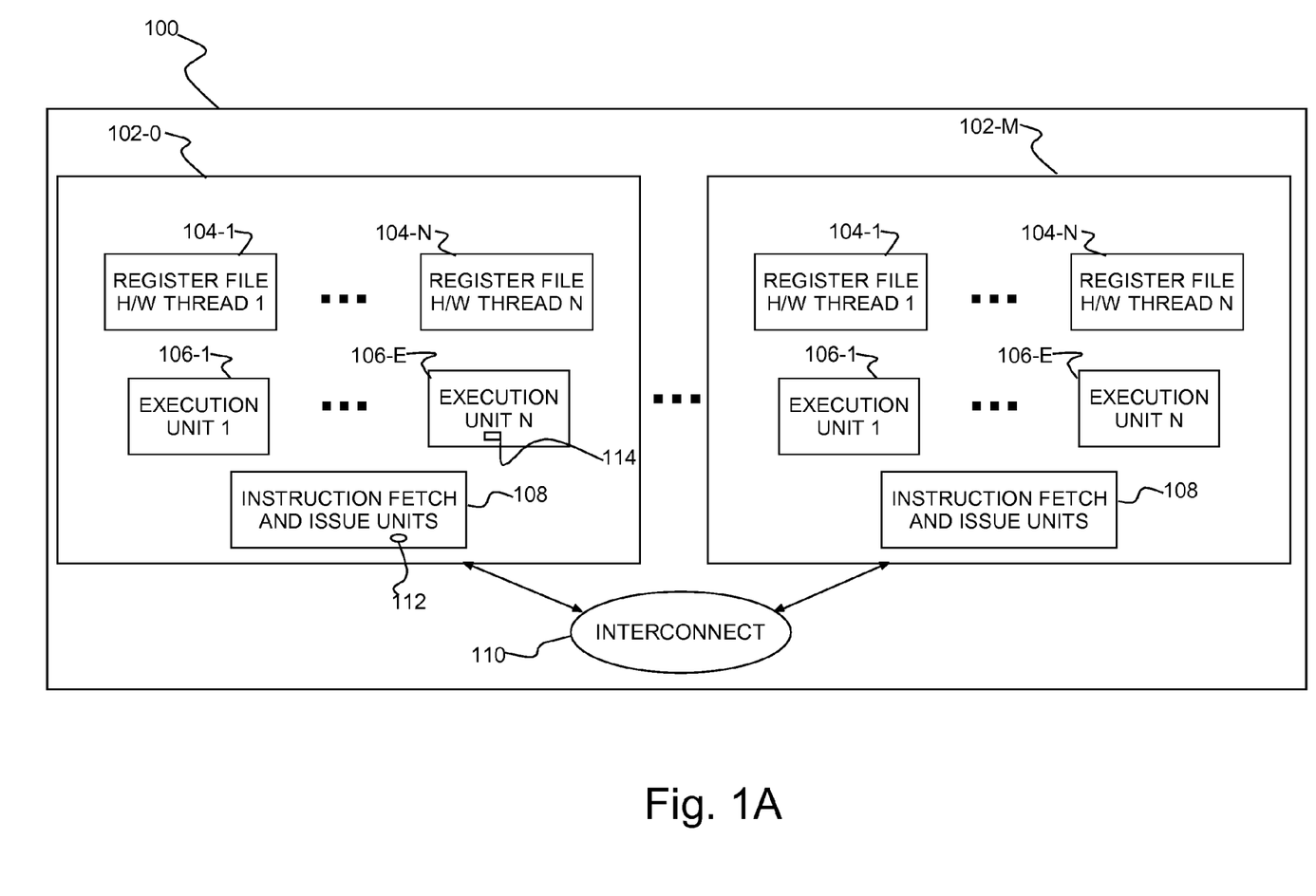
FIGS. 1A-B show an example of power management as applied to a single Integrated Circuit (IC) chip for balanced on-chip heating, according to a preferred embodiment of the present invention.
Figure 1B:
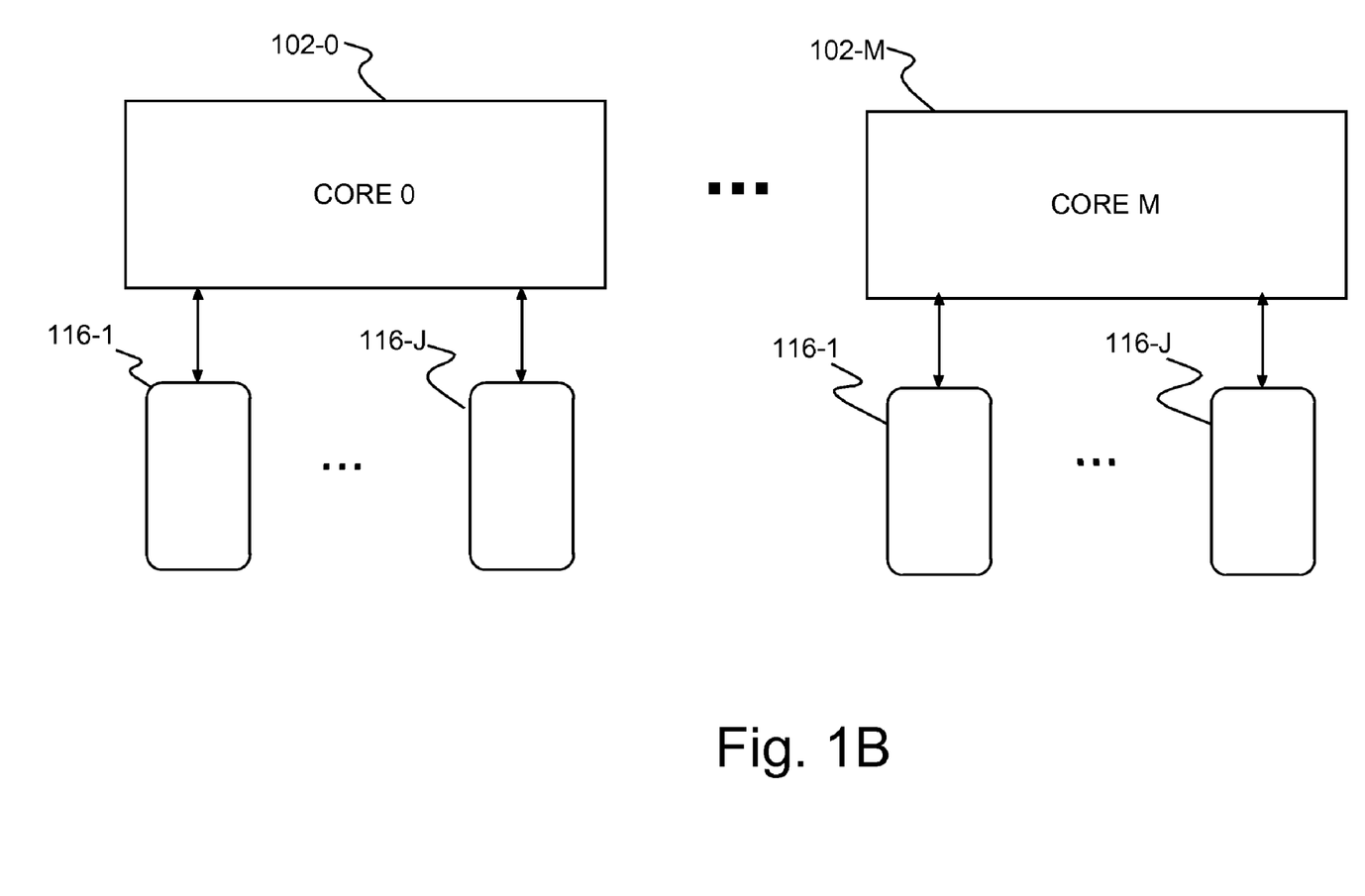

Turning now to the drawings, and more particularly, FIGS. 1A-B show an example of power management as applied to a single Integrated Circuit (IC) chip 100 for balanced on-chip heating, according to a preferred embodiment of the present invention. The chip 100 of this example is a superscalar processor that includes a number (M+1) of processing or core units 102-0-102-M. Each core unit 102-0-102-M is Simultaneous MultiThreading (SMT) capable, allowing multiple tasks to share (i.e., run on) the same core or processing unit 102-0-102-M. So, each core unit 102-0-102-M includes a number (N) of register files 104-1-104-N, a number (E) of execution units 106-1-106-E, and Instruction and Fetch units, represented collectively by block 108. A preferred thermal aware Operating System (OS) or Virtualization (sometimes known as the Hypervisor) schedules task execution by the core units 102-0-102-M. Also under OS/Hypervisor control, tasks can migrate among core units 102-0-102-M through an interconnect 110. Preferably, each sub-unit 104-1-104-N, 106-1-106-E, and 108 includes one or more temperature sensors (e.g., 112) or utilization counters (e.g., 114). The temperature sensors 112 and/or utilization counters 114 provide performance and temperature information to the OS/Hypervisor. The OS/Hypervisor maintains task queues 116-1-116-J for each core 102-0-102-M, where J can be one queue for each hardware thread (J=N), one per core or any other suitable assignment.

Temperature sensors 112 and performance counters 114 are well known in the art for hardware and software monitoring microprocessor temperature and performance and especially for monitoring each processing element. A typical such system may have a single sensor on each core, while a more heavily monitored system may have multiple sensors on each core. Typically, the sensors are strategically placed at each known core hot spot location. The processor/OS monitors the sensors to provide a temperature history for individual tasks as well as a current processing unit temperature. The present invention uses this temperature history in thermal-aware scheduling incorporated into existing scheduling and load-balancing in the OS and Virtualization layer.

Thermal-aware scheduling according to the present invention incurs little if any additional scheduling overhead, because it is incorporated into existing state of the art OS and Virtualization layer scheduling. Notably, thermal-aware scheduling according to the present invention leverages existing OS scheduling and load balancing capabilities supporting concurrency and extends those of concurrency scheduling techniques to address chip/core thermal conditions. Therefore, by considering temperature history in carefully choosing which tasks to run together, whether in SMT, on the same or nearby processing units, each group of tasks cools down naturally. If hotspots do develop, the OS may perform additional task swapping.

Thus, a preferred thermal aware OS/Hypervisor includes an integrated thermal management system that balances on-chip heating to mitigate and eliminate on-chip hotspots. In particular, a preferred thermal aware OS/Hypervisor identifies on-chip hotspots as they develop, as they are developing or, once they have developed with varying granularity based on interrupts and periodic checks, e.g., scheduler ticks. Once identified, the thermal aware OS/Hypervisor applies an appropriate mitigation technique based on the state of the particular hotspot. The mitigation techniques are selected for different triggering conditions and response times and may include, for example, user-specified core hopping, chip-level multiprocessors (CMP) heat-balancing, SMT heat-balancing, deferred execution and core-hopping, and reducing threading. Preferably, these techniques are applied to mitigate heating in accordance with the immediacy of the response needed with slower acting techniques being applied for longer term relief and faster acting techniques being applied when and as needed for more immediate relief.

So for example, user-specified core-hopping migrates a task when a timer, performance counter or temperature sensor (e.g., 112, 114) reaches a selected value. If core-hopping is not specified, the preferred thermal aware OS/Hypervisor reduces chip temperatures and mitigates hot-spots using one of the other available techniques. CMP and SMT heat-balancing techniques, which have slower response times to heating events but incur less overhead than core-hopping, may trigger at relatively low temperatures or temperature changes.

If CMP and SMT heat-balancing are unsuccessful at stopping on-chip temperature from rising, then the preferred thermal aware OS/Hypervisor triggers Deferred Execution/Core Hopping. If Deferred Execution/Core Hopping fails to stop on-chip temperatures from rising, the preferred thermal aware OS/Hypervisor may invoke a hardware-triggered temperature management, such as fetch-throttling or frequency/voltage scaling or a system failure.

Figure 2:
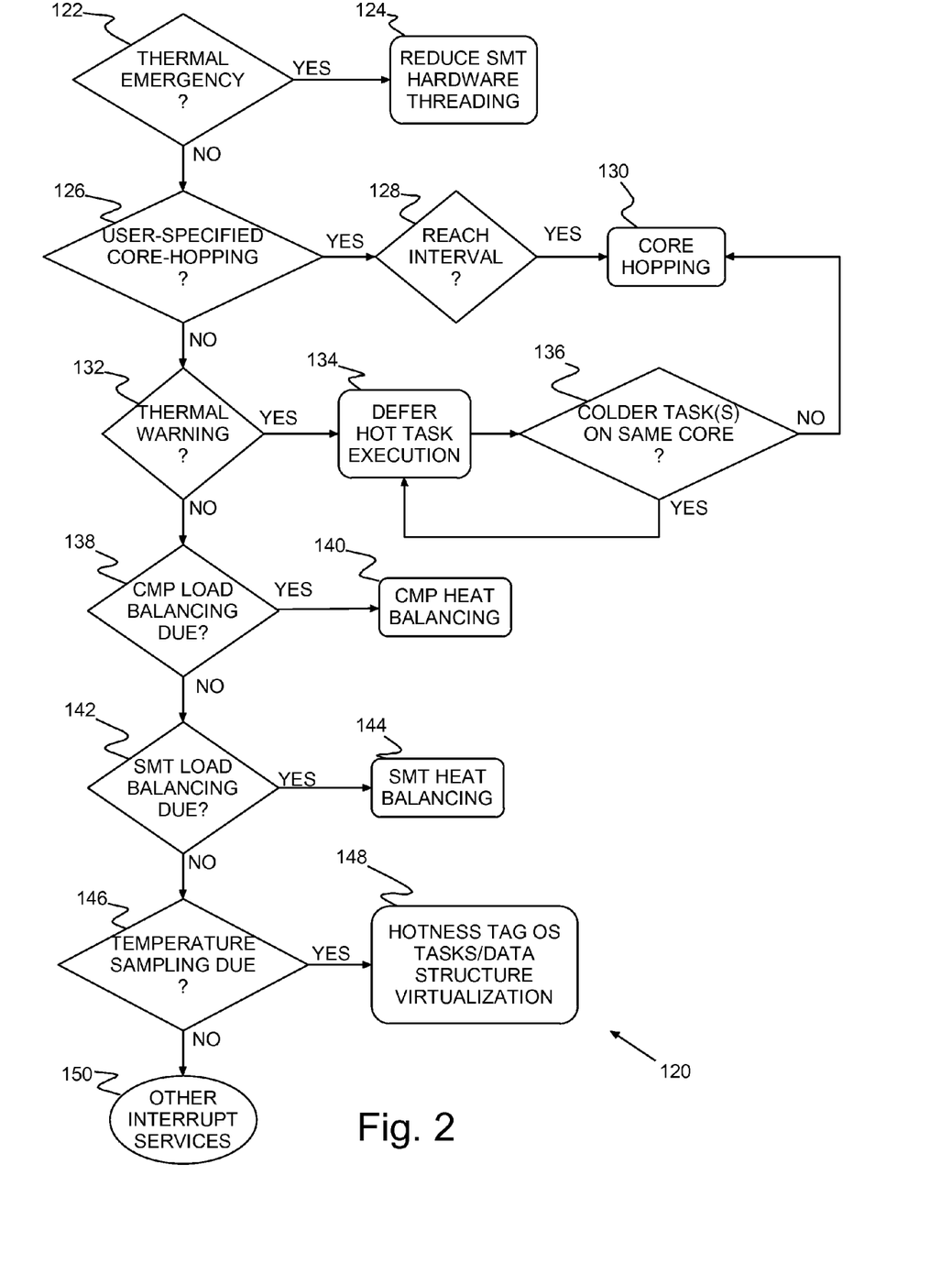
FIG. 2 shows an example of managing power for balanced on-chip heating.

FIG. 2 shows an example of managing thermal chip conditions 120, e.g., in IC chip 100, for balanced on-chip heating according to a preferred embodiment of the present invention. Task performance and scheduling is with a time granularity that is much smaller than chip thermal constants. So again, temperature mitigation techniques are applied to mitigate heating in accordance with the immediacy of the response needed. So with each timer interrupt or scheduler tick, in step 122 if on-chip temperatures (e.g., in one or more locations) are found to have risen in at least one sensor to what may be considered or is defined as a thermal emergency, then hardware or software triggered temperature management is invoked to reduce SMT hardware threading 124. If however, a thermal emergency does not exist in step 122, then in step 126 the OS/Hypervisor checks to determine whether user-specified core-hopping is selected. If user-specified core-hopping has been selected, then in step 128 the OS/Hypervisor checks to determine whether the hop interval has ended and the next interval is to begin. If in step 128 the hop interval has ended, then in step 130, the OS/Hypervisor implements core-hopping. If, however, in step 126 user-specified core-hopping is not found selected, then in step 132 if on-chip temperatures are found to have risen in at least one sensor to what may be considered or is defined as a thermal warning, then in step 134 tasks in the hot-spot may be deferred to allow the spot to cool. Optionally in step 136, if the OS/Hypervisor finds that there is no other colder task to run on the same core, then in step 130, the task(s) may be passed to a colder core. Otherwise, the OS/Hypervisor maintains the task within the same, current core. If a thermal warning is not found in step 132, then in step 138, the OS/Hypervisor checks whether inter-core (CMP) load balancing is due. If CMP load balancing is due, then in step 140 the OS/Hypervisor implements CMP heat balancing. Otherwise, in step 142, the OS/Hypervisor checks whether intra-core (SMT) load balancing is due. If SMT load balancing is due, then in step 144 the OS/Hypervisor implements SMT heat balancing. If SMT load balancing is not due, then in step 146 the OS/Hypervisor checks whether temperature sampling is due for the various tasks (at context switch or another granularity) being managed. If temperature sampling is due, then in step 148 OS/Hypervisor data structures are tagged for hotness of executing tasks and the sampled data is stored for CMP and/or SMT thermal balancing. Finally, if temperature sampling is not due, then in step 150 the OS/Hypervisor handles other interrupts/services.

Figure 3A:
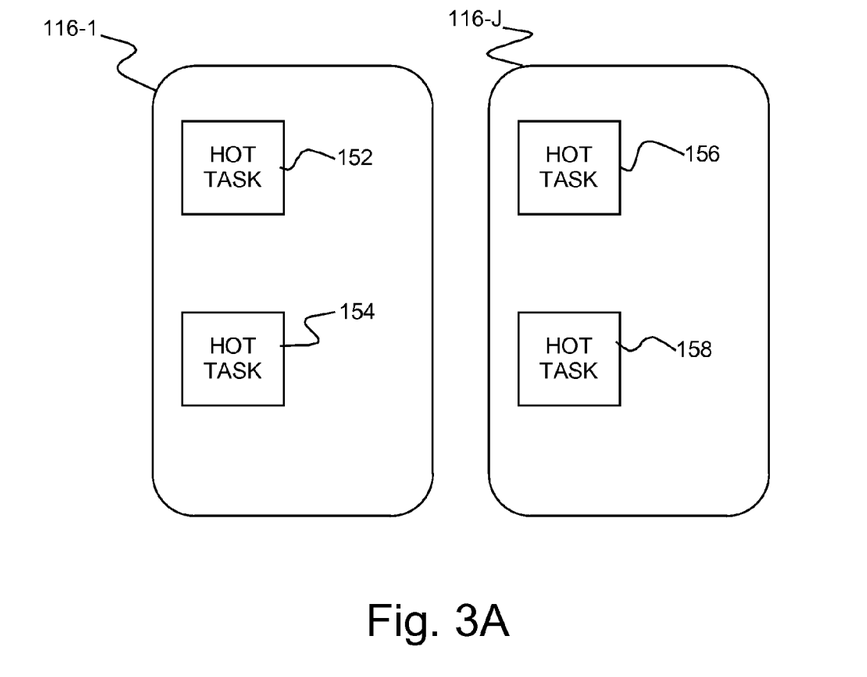
FIGS. 3A-B show an example of reducing number of threads for SMT.
Figure 3B:
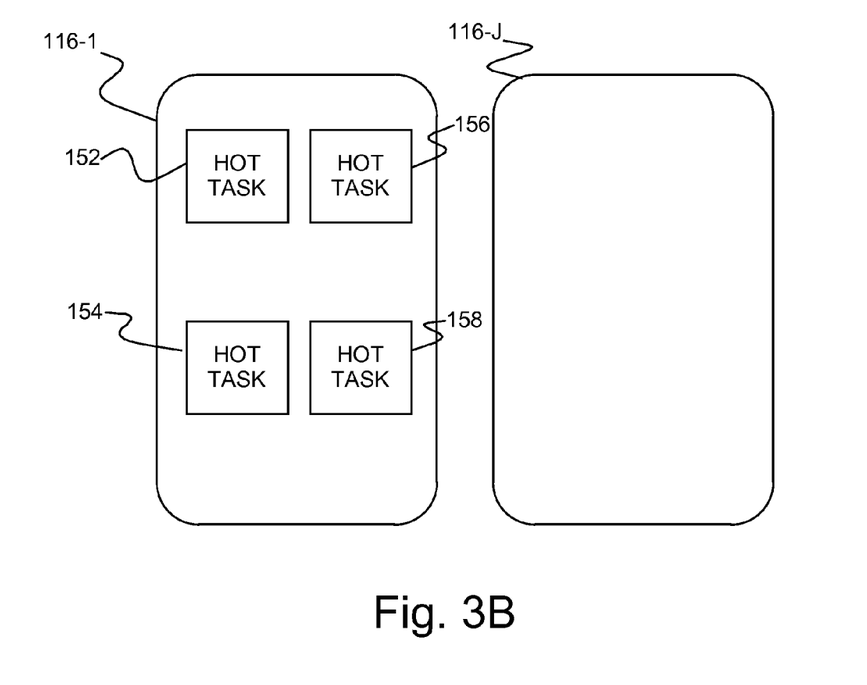

FIGS. 3A-B show an example of reducing number of threads for SMT in step 124 of FIG. 2, according to a preferred embodiment of the present invention. When task queues (e.g., 116-1 and 116-J in FIG. 1B, where in this example J=2) in an SMT-enabled core, e.g., 102-0 in IC chip 100 in FIGS. 1A-B, are found in step 122 to be fully-loaded or over-loaded with hot tasks, 152, 154, 156, 158, there is insufficient heat slack such that either heat-balancing or deferred execution in subsequent steps could reduce on-chip hotspots. Heat slack may be defined as the availability of colder cores or tasks that can be used to reduce hot spots while running hot tasks. So, in step 124 the OS/Hypervisor reduces the number of threads for SMT for a fast response, reducing chip workload and trading performance to reduce core temperature.

State of the art systems employ hardware-enabled fetch throttling and/or dynamic frequency/voltage scaling to reduce workload and thus temperature. Unfortunately, these state of the art approaches may lead to what is referred to as starvation. So, preferably, to lower temperatures while maintaining reasonable throughput, the preferred OS/Hypervisor reduces the number of utilized SMT hardware threads. This reduces utilization on the heated processing units without migrating the tasks to other cores, i.e., when without migrating the tasks to other cores is not available. Thereafter, the OS/Hypervisor scheduler may check the core temperature periodically and increase the number of utilized hardware threads as the core temperature drops to a preset colder temperature threshold.

So in this example, hot tasks, 152, 154, 156, 158, are located in two task queues 116-1 and 116-J and both software task queues 116-1 and 116-J have a load of 2 and a hotness of 2. Both hardware threads are enabled and the tasks 152, 154, 156, 158, are evenly distributed on each hardware thread, i.e., in task queue 116-1 and 116-J, respectively. Unfortunately, running these two threads simultaneously increases core temperature. However, the temperature can be reduced through reducing the number of active hardware threads in SMT.

In FIG. 3B, after the OS/Hypervisor detects overheating in step 122, either through pooling or a temperature-triggered interrupt. The OS/Hypervisor reduces the number of utilized hardware threads to one by moving the tasks 156, 158, from task queue 116-J to task queue 116-1. After the move, software task queue 116-1 has a load of 4 and a hotness of 4; and the software task queue 116-J has a load of 0 and a hotness of 0. This allows the core to cool down because of reduced utilization from the reduced number of hardware threads, i.e., hot tasks will not be in both task queues 116-1 and 116-J simultaneously.

Figure 4A:
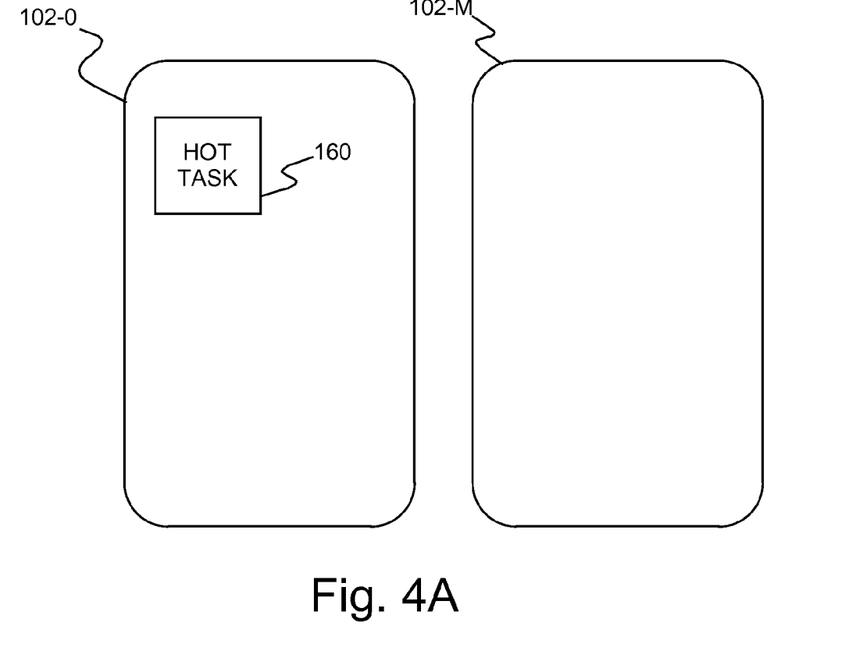
FIGS. 4A-B show an example of user specified core-hopping, wherein a user may specify a maximum interval and/or a maximum number of times a task can be run on a particular core.
Figure 4B:
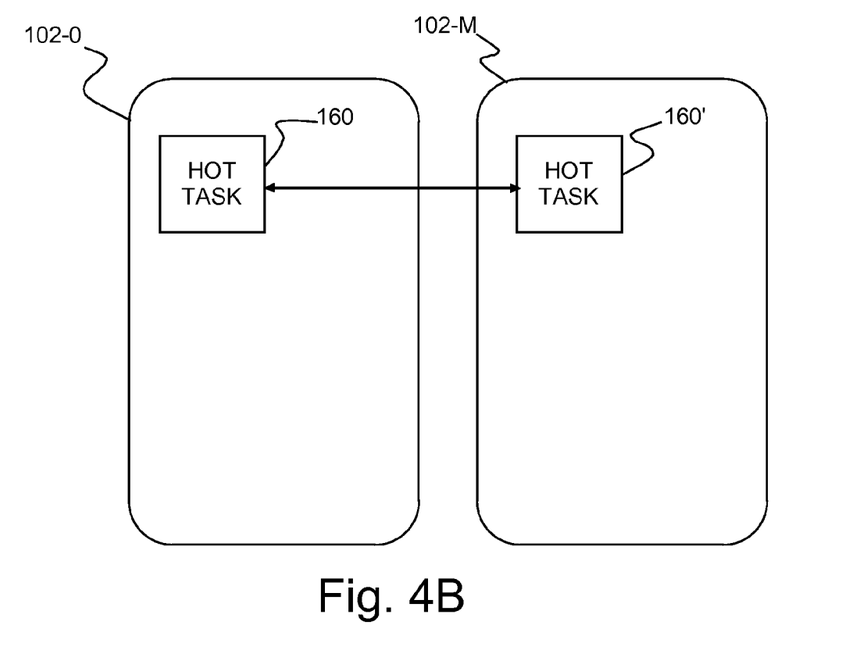

FIGS. 4A-B show an example of user specified core-hopping 128, wherein if a user knows a priori that a task (e.g., through profiling) causes high on-chip temperature, the user specifies a maximum interval and/or a maximum number of times a task can be run on a particular core 102-0-102-M. For example, a user may specify a value indicating an upper limit on the time that the task can run on each core 102-0-102-M. So in the example of FIG. 4A, without core hopping a hot task 160 may begin on one core, e.g., 102-0, and continue there, repeatedly until the task completes. With core hopping, after running for a user-specified interval, typically, ten milliseconds, the task routinely migrates from one core 102-0 to another, e.g., 102-M. Normally migration occurs regardless of the temperature of the current core, i.e., the core that is running the task. Typically, the destination core is user-specified or a colder core chosen by the OS/Hypervisor. So, as shown in the example of FIG. 4B hot task 160' migrated from initial core 102-0 to core 102-M. Typically user specified core-hopping 128 relies on a hardware timer to trigger core-hopping at the selected interval and does not normally use thermal sensor information.

If thermal sensors (e.g., 112 in FIG. 1A) are available, however, the user can specify migration based on temperature. The OS/Hypervisor can migrate tasks, e.g., 160, only at a selected temperature, i.e., sensed thermal information indicates that the current core (102-0 in this example) is hot and, therefore, that the task 160 should be moved. Similarly, if the units include performance counters (e.g., 114 in FIG. 1A) the user can specify migration based on the count. The performance counters provide dynamic information on execution unit frequency. The trigger count may be user provided, for example, or an OS default. The OS/Hypervisor also can specify the frequency of the destination core, i.e., the core that the task is hopping to and, further, lower the frequency or perform low-power management on the current core, i.e., the core from which the task is hopping.

Modern operating systems employ dynamic load balancing to improve response times and prevent what is known as starvation when the processor is overloaded (i.e., when the processor has equal or more tasks than the number of cores times the number of SMT hardware threads). Load-balancing employs task migration to minimize the differences in task queue length (i.e., number of tasks) for each core. Thermal-aware scheduling may be enabled according to a preferred embodiment of the present invention by preventively implementing and extending load-balancing to take into account the thermal characteristics of each task and each core when making task-migrating decisions.

When the OS/Hypervisor determines that the processor is overloaded, the heat-balancing OS/Hypervisor extension attempts to assign hot and cold tasks for each core and to identify temporal heat slack among the assigned tasks. Temporal heat slack may be defined as the availability of colder tasks or idle times that can be used to reduce hot spots while running hot tasks. When the OS/Hypervisor determines that the processor has fewer tasks than the number of cores, typical state of the art load balancing does not migrate any tasks. However, a preferred embodiment OS/Hypervisor performs CMP heat-balancing to move a hot task to a colder, idle core to create spatial heat slacks. Spatial heat slack may be defined as the availability of colder or idle cores that can be used to reduce hot spots while running hot tasks. Thus a preferred OS/Hypervisor minimizes performance overhead of thermal-aware scheduling by piggy-backing CMP heat-balancing onto typical state of the art load-balancing. By leveraging state of the art load-balancing, a thermal scheduler in the OS/Hypervisor does not require starting task execution on a cold core.

Typical state of the art load-balancing minimizes the differences in number of tasks for each task queue. Using the Linux OS scheduler, for example, a heat optimizer may be added to such a state of the art load-balancing function. The heat optimizer provides the same number of hot/cold tasks in each queue and migrates hot tasks to cold queues. The OS/Hypervisor identifies hot and cold tasks through recorded history data, e.g., temperature sensor history or recorded utilization counter results.

Figure 5A:
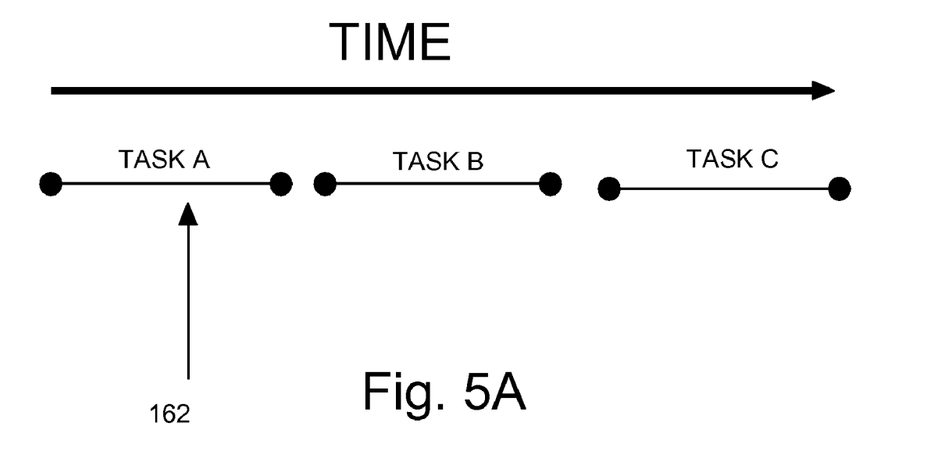
FIGS. 5A-B show an example comparing normal task execution for three tasks, A, B and C with deferred hot task execution.
Figure 5B:
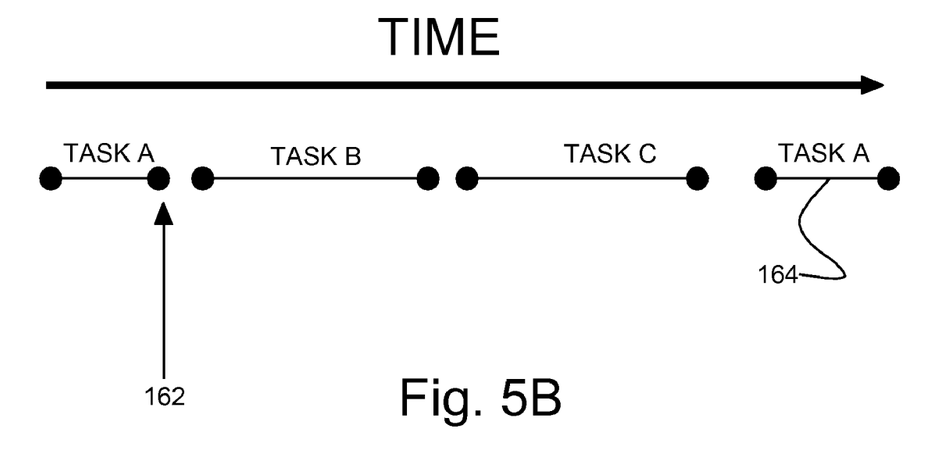

FIGS. 5A-B show an example comparing normal task execution for three tasks, A, B and C with deferred hot task execution, e.g., in step 134 in FIG. 2, for the same three tasks. In this example Task A is a hot task and Task B and Task C are cold tasks. Deferred hot task execution 134 may be necessary in those instances where insufficient time is available to trigger CMP heat-balancing 140 and/or SMT heat-balancing 144 to prevent core temperatures from rising. Deferred execution 134 is a reactive scheme in the scheduler that may be employed, for example, when a core has multiple tasks and one of the tasks consistently heats up the core. As noted above, such heating may be determined (at 162) by the thermal sensors (e.g., 112 in FIG. 1), performance counters (e.g., 114) or other proxies through pooling or interrupts. Without deferred hot task execution Task A continues until it finishes.

By contrast with deferred hot task execution the scheduler temporarily suspends the time slice of current running hot task (Task A) to allow other colder tasks to run before Task A further heats up the core. The suspended hot task may resume 164 after some selected time period with other cold tasks running on the core until the hot task resumes. Alternately, similar to thermal-triggered task swapping, the suspended hot task 164 may resume when the core/execution unit reaches a specified lower temperature threshold. Optionally in step 136 of FIG. 2, deferred execution may also migrate hot tasks from the current core to other colder cores. This optional step 136 is similar to thermal-triggered core-hopping. Alternately, deferred execution may assign shorter time slices for hot tasks, to allow other, colder tasks to progress.

Figure 6A:
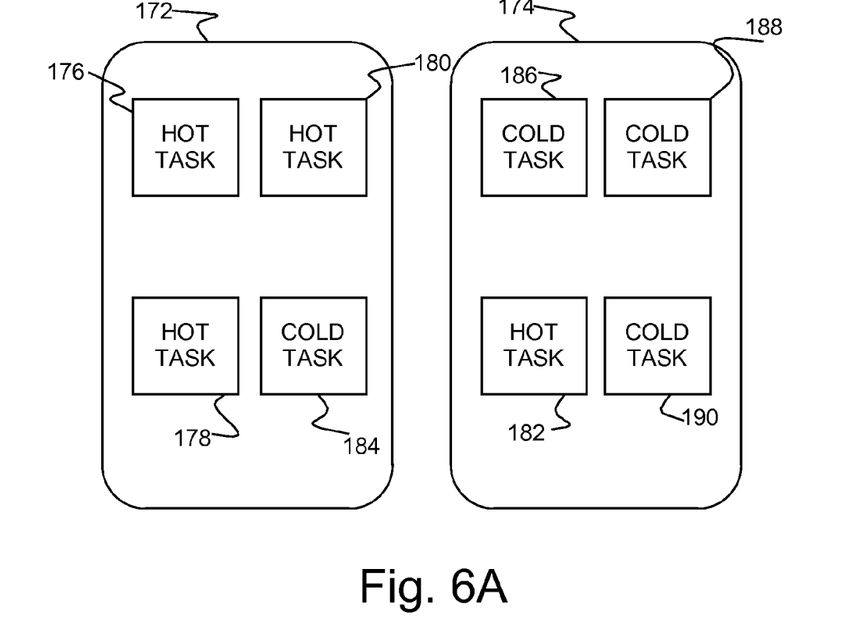
FIGS. 6A-B shows an example comparing typical state of the art OS/Hypervisor balancing with CMP heat-balancing a dual-core system.
Figure 6B:
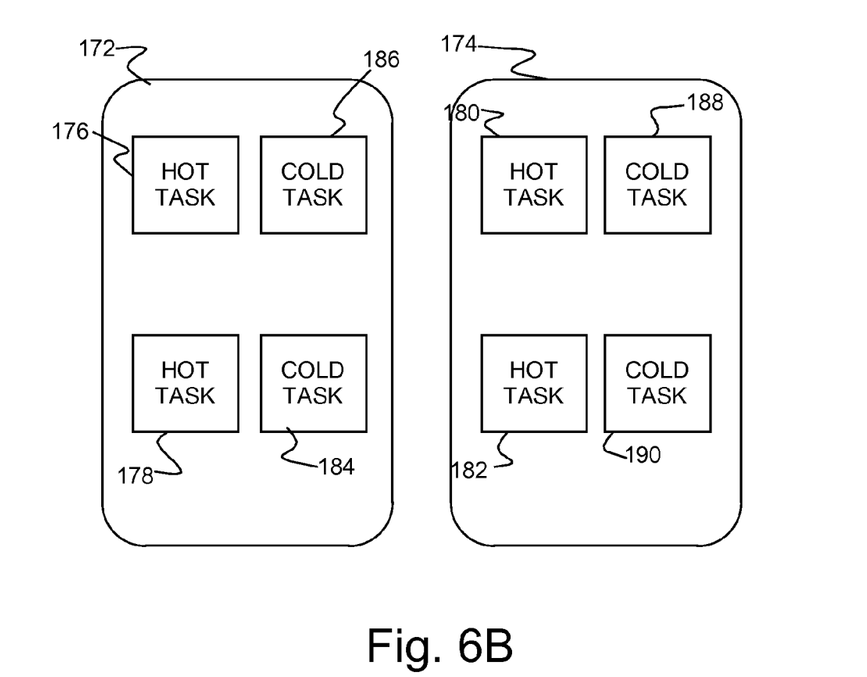

FIGS. 6A-B compare an example of a typical state of the art OS/Hypervisor balancing with CMP heat-balancing (140 in FIG. 2) in system 170 that in this example is a dual-core 172, 174 system, wherein known hot tasks are moved away from hot cores. In particular, FIG. 6A shows a default Linux scheduler load balancing as compared with CMP heat-balancing 140 in FIG. 6B, according to a preferred embodiment of the present invention. Although the default Linux scheduler balances system in the sense that both cores 172, 174 have the same number of tasks 176, 178, 180, 182, 184, 186, 188, 190, core 172 has three hot tasks 176, 178, 180, while core 174 has only one 184. So for this example, the software task queue for core 172 has a load of 4 and a hotness of 3; and the software task queue for core 174 has a load of 4 and a hotness of 1. Consequently in this example, core 172 is more likely to over-heat than is core 174.

By contrast as can be seen from the example of FIG. 4B, with application of CMP heat-balancing in a preferred heat optimizer, each core 172, 174 has the same number of hot tasks 176, 178, 180, 184 and cold tasks 182, 186, 188 190, while maintaining a balance load. So for this rebalanced example, the software task queue for both cores 172, 174 has a load of 4 and a hotness of 2.

The OS/Hypervisor performs what is known as concurrency scheduling, periodically performing context switches among the tasks 176, 178, 180, 182 and 184, 186, 188, 190. The heating time (100 s of milliseconds) is typically at least an order of magnitude larger than the frequency with which the OS/Hypervisor typically performs context switches. By choosing the right group of tasks 176, 178, 180, 182 and 184, 186, 188, 190 to run together in the cores 172, 174, the cores 172, 174 have an opportunity to cool down because of context switching between hot tasks 176, 178, 180, 184 and cold tasks 182, 186, 188, 190. Optionally, CMP heat-balancing 140 may leverage priority information, e.g., giving cold tasks 182, 186, 188 190 priority over hotter tasks 176, 178, 180, 184 at the expense of accepting potentially degrading performance of lower priority hotter tasks 176, 178, 180, 184.

Figure 7A:
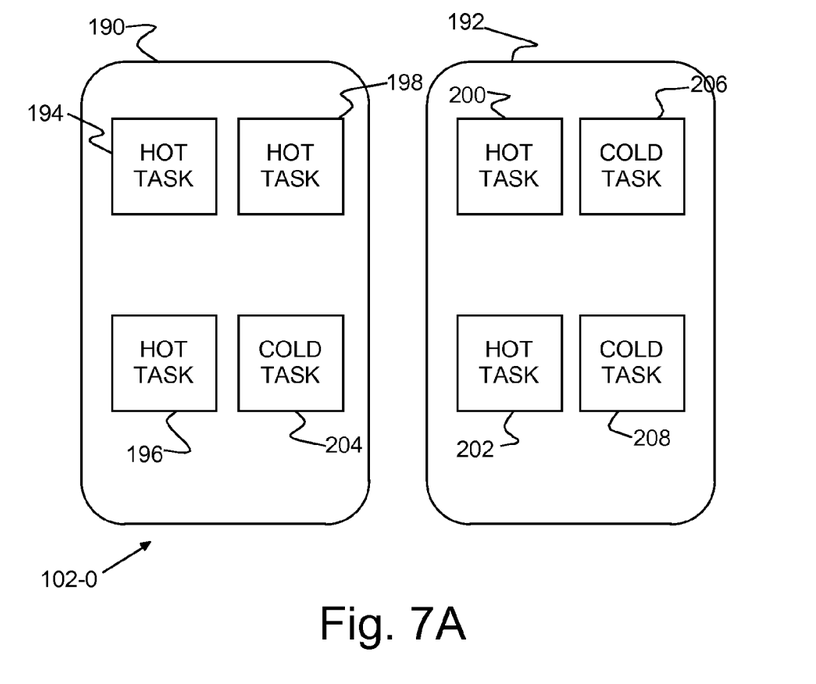
FIGS. 7A-B show an example comparing a typical state of the art SMT balanced core with application of heat-balancing within the same core.
Figure 7B:
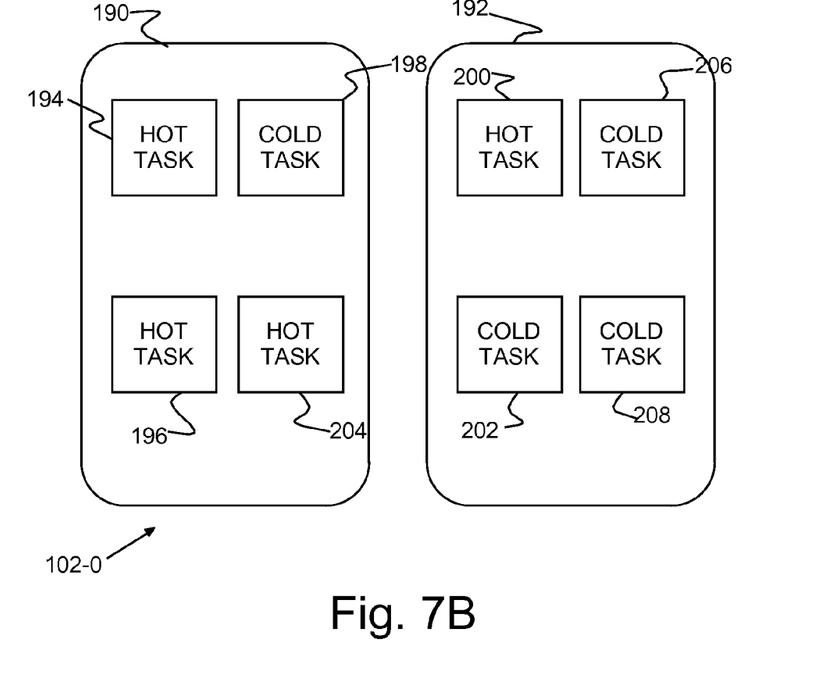

FIGS. 7A-B show an example comparing a typical state of the art SMT balanced core, e.g., 102-0, with application of heat-balancing step 144 of FIG. 2 within the same core, 102-0, wherein task execution is rearranged to reduce the probability of adjacent hot tasks executing simultaneously. In this example, a Linux scheduler supports SMT in two hardware threads, 190, 192 in the core, 102-0 with active/running hot tasks 194, 196, 198, 200, 202 in FIG. 7A. Although in this example the task assignment is balanced in the sense that both hardware threads 190, 192 have the same number of tasks, thread 190 has three hot tasks 194, 196, 198, while thread 192 has two 200, 202. Ideally, to mitigate proximity heating whenever a hot task 194, 196, 198, 200, 202, is running in one core (e.g., 190), a cold task 204, 206, 208 is running in the other 192 and vice versa. However, the software task queue for thread 190 has a load of 4 and a hotness of 3; and the software task queue for core 192 has a load of 4 and a hotness of 2. So for this example, the task distribution of FIG. 7A has a relatively high probability that two hot tasks 194, 196, 198, 200, 202 run simultaneously, with a corresponding increase resulting local temperature accumulating in the core 102-0.

By contrast with the preferred thermal-aware SMT heat-balancing scheduler hot tasks 194, 196, 198, 200, 202 are segregated from cold tasks 204, 206, 208 to the extent possible. So in the example of FIG. 7B, tasks assignment is such that hot tasks 194, 196, 198, 200 are packed onto hardware-thread 190, and cold tasks 204, 206, 208 are packed onto thread 192 with remaining hot task 202. So for this rebalanced example, the software task queue for thread 190 has a load of 4 and a hotness of 4; and the software task queue for core 192 has a load of 4 and a hotness of 1. Thus, maintaining the number of tasks on each thread 190, 192 in accord with the original load-balancing, the probability of two hot tasks 194, 196, 198, 200, 202, running simultaneously on the rebalanced core 102-0 is significantly reduced. Minimizing the occurrence of multiple simultaneously active hot tasks 194, 196, 198, 200, 202, reduces local heating. SMT heat-balancing can be used in conjunction with CMP heat-balancing. In addition, SMT heat-balancing may be used also to leverage priority information when performing SMT task balancing. For example, cold, high priority tasks may be restricted from being placed on the same core as low priority tasks. Such a placement avoids triggering dynamic thermal management by the hot low priority tasks that may penalize performance of both low-priority and high-priority tasks.

Figure 8:
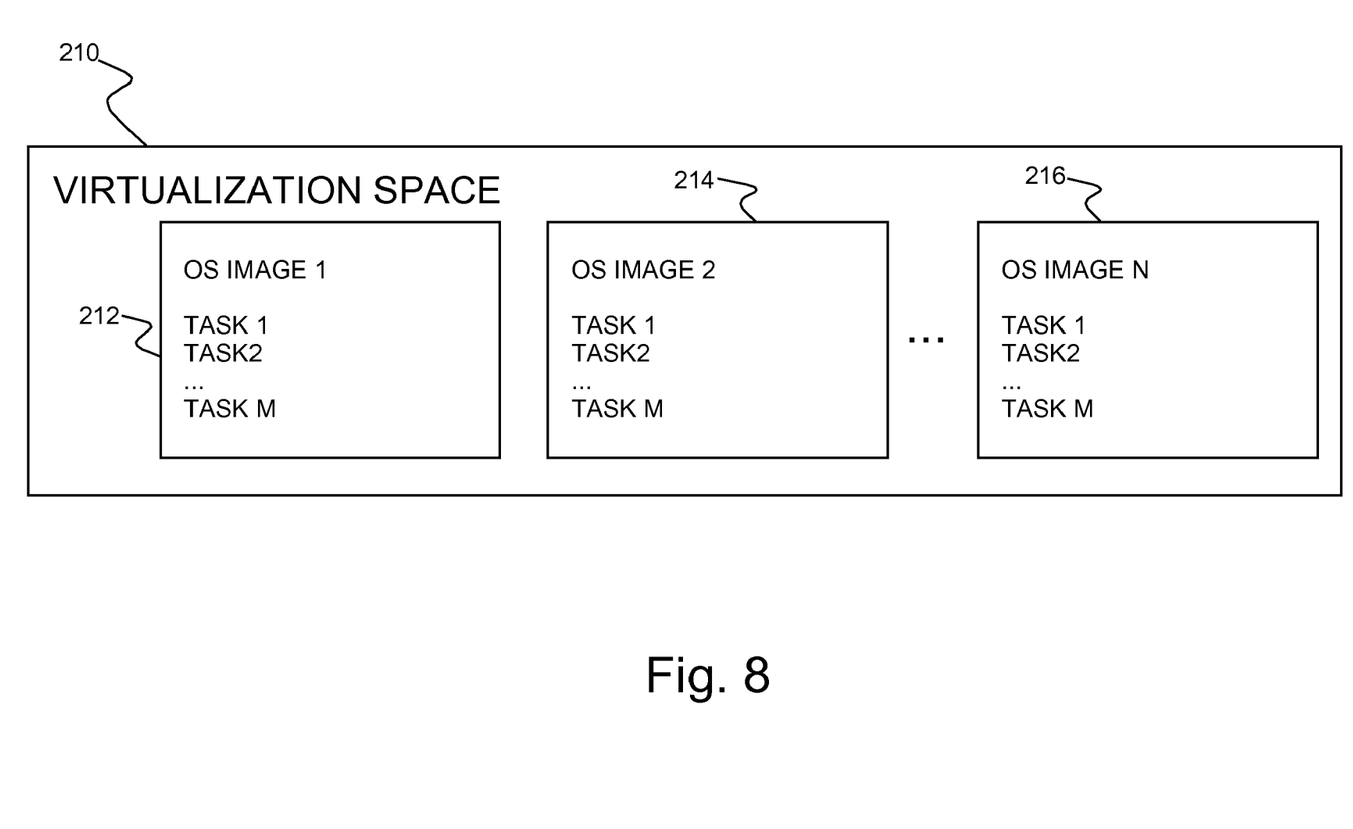
FIG. 8 shows an example of cooperative system-level thermal-aware scheduling.

FIG. 8 shows an example of cooperative system-level thermal-aware scheduling according to a preferred embodiment of the present invention. A system or processor chip 210 with virtualization may have multiple OSs, each occupying one or more cores 212, 214, 216, e.g., using partitioning in time, space or hardware thread. Because an OS might run hot tasks that cause heating and performance loss for subsequent tasks or tasks on a nearby partition, these OSs must coordinate with thermal-aware scheduling. In one embodiment the virtualization layer performs thermal-aware scheduling without informing the OSs. Alternately, thermal-aware scheduling may be cooperative with information exchanged between OSs and Virtualization. In another embodiment, the virtualization performs thermal-aware scheduling on multiple OSs as described hereinabove, e.g., scheduling hot OSs with cold OSs in the same core, in adjacent cores or alternating in time without informing the OSs. In still another embodiment, the virtualization constrains each OS to reduce the number of utilized SMT threads to lower the temperature. In yet another embodiment, each OS supplies task priority information of the tasks and priority information for the OS itself. Then, the virtualization considers this priority information for thermal-aware scheduling.

Figure 9:
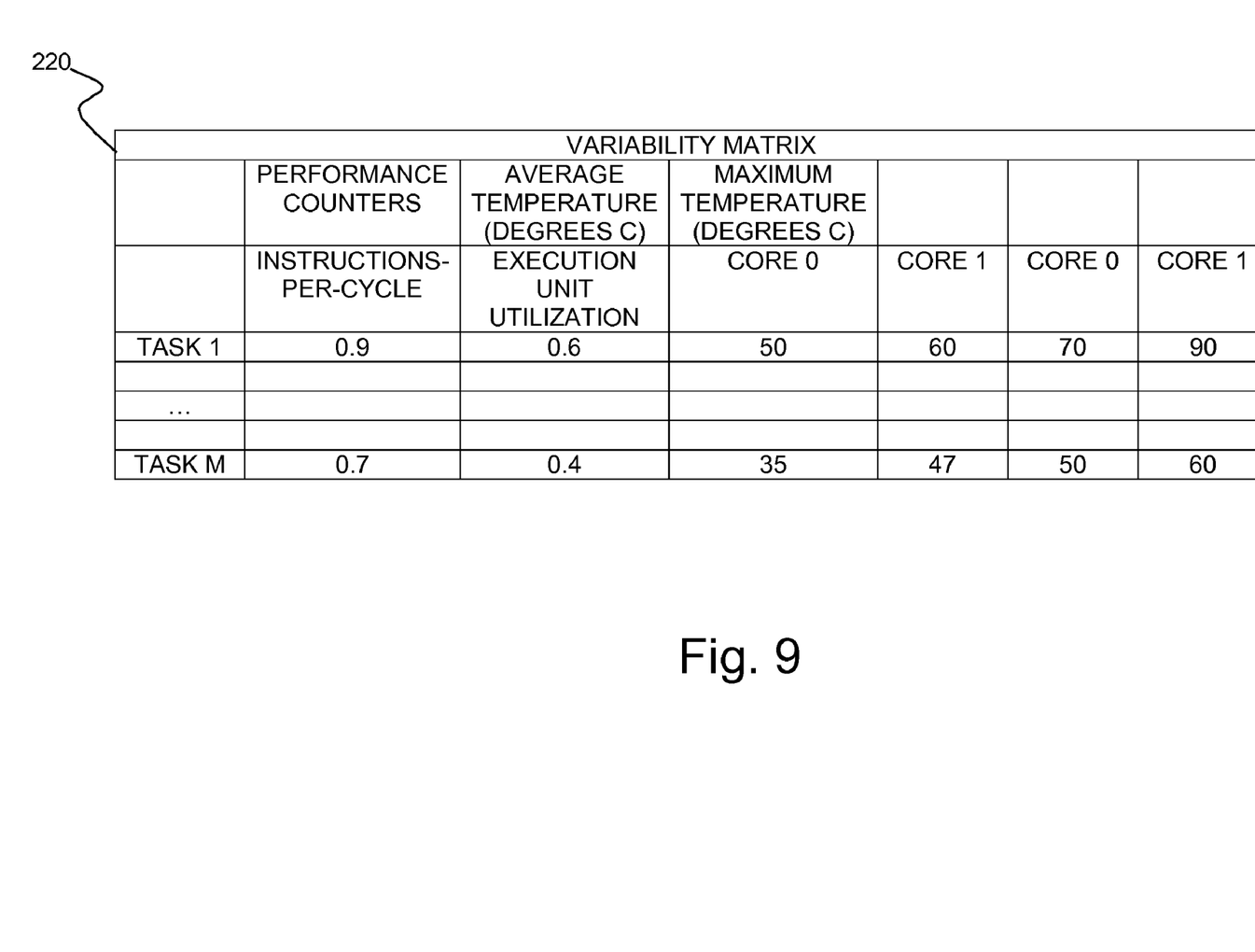
FIG. 9 shows an example of a variability matrix collected, e.g., by the OS, for considering process/manufacturing variability and heterogeneity for thermal-aware scheduling.

FIG. 9 shows an example of a variability matrix 220 collected, e.g., by the OS for considering process/manufacturing variability and heterogeneity for thermal-aware scheduling according to a preferred embodiment of the present invention. Frequently, the cores have different thermal characteristics, e.g., different cores heat up to different temperatures when running same tasks. Each of these cores may have a unique static frequency, and may or may not have dynamic frequency/voltage scaling. As used herein, process or manufacturing variability is the variability between cores that arises from the manufacturing process. Typically, even across a single Integrated Circuit (IC) chip there is a process variability in each IC chip layer, e.g., from across chip line width variation (aclv), line thickness variation and interlayer thickness variation, such as dielectric thickness variation. Since these variations affect chip device characteristics, variability may be pronounced across chip, causing transistor size variations or random leakage. So, because of these and other circuit variations, especially for large complex chips such as state of the art high performance superscalar processor chips, there is variation in core characteristics. Such other circuit variations may include, for example, design weaknesses such as uneven voltage supply, or wear-and-tear effects on the cores, such as what is known as Negative-Biased Temperature Instability (NBTI). Consequently, no two cores, even adjacent cores, have exactly the same heating properties. Because of these differences, cores are somewhat heterogeneous with differing functionality and that may require power-performance trade-offs.

So, the OS or virtualization layer collects and keeps information about the characteristics of each core when the core runs difference tasks. The variability matrix 220 is a tabular example of collected such information that the OS or virtualization layer uses to take variability and heterogeneity into consideration when performing thermal-aware scheduling. In this example, the variability matrix 220 includes an entry for each previously executed or currently executing task with average counter values and corresponding temperatures. The average counter values include the number of instructions per cycle and execution unit utilization for each task. The corresponding temperatures include the average and maximum temperatures for each core. The values may be obtained, for example, through user/compiler profiling or dynamically through proxies, e.g., thermal sensors or performance counters in conjunction with manufacturer supplied information.

These collected characteristics may be taken into consideration during thermal scheduling. For user-specified core-hopping (126-130 in FIG. 2), for example, the user can specify to run longer on cores that heat up slower and run shorter on cores that heat up faster. For CMP and SMT heat-balancing (138-144 in FIG. 2), for example, the variability table 220 is useful when considering migration and mixing groups of tasks to run. Each task may be weighted using different heat weights that depend on which core the task is scheduled to run. For reducing the number of threads (138-144 in FIG. 2), for another example, by first reducing threads from cores that heat up the most with the same workload, the system's peak temperatures are reduced more effectively.

Figure 10:
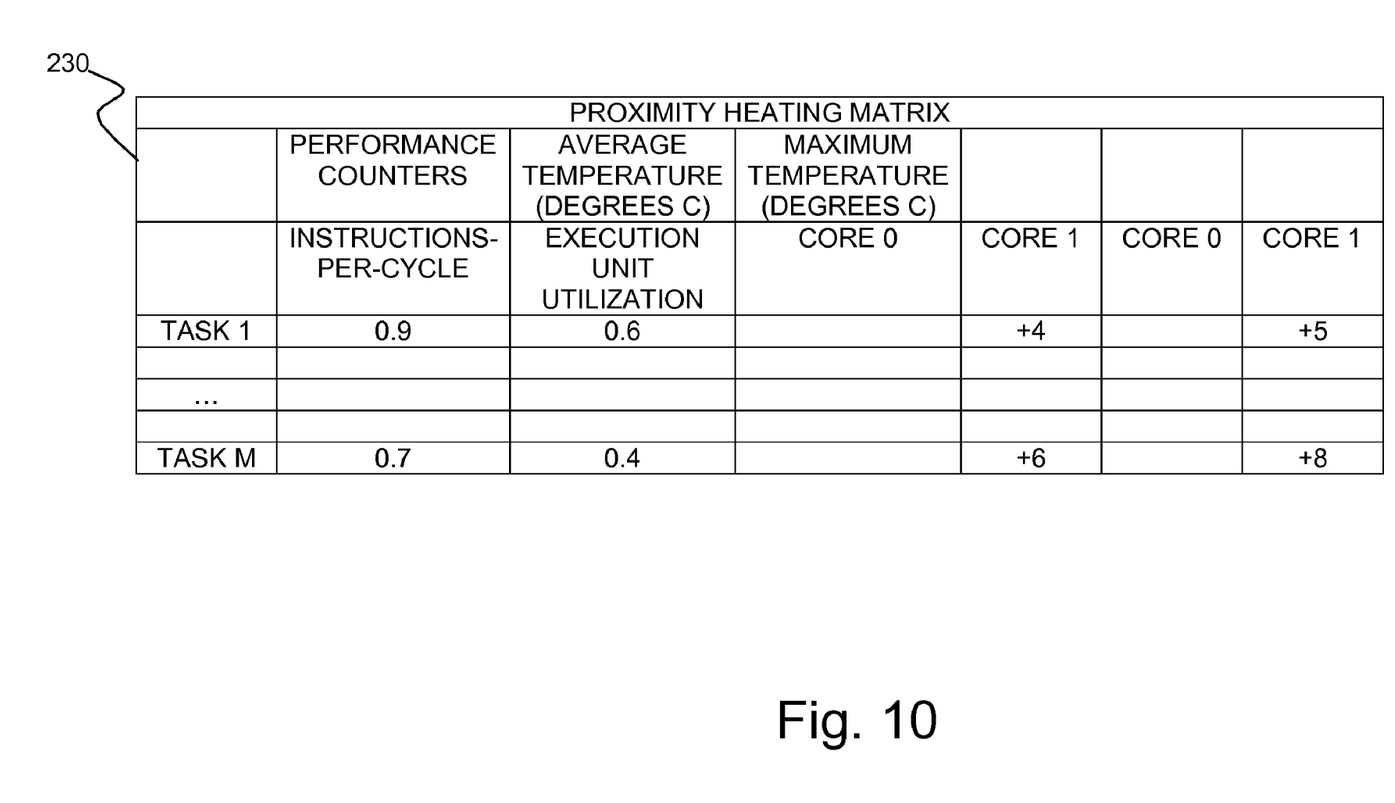
FIG. 10 shows an example of a proximity heating matrix 230 in the OS/Virtualization for considering lateral proximity heating thermal-aware scheduling.

FIG. 10 shows an example of a proximity heating matrix 230 in the OS/Virtualization for considering lateral proximity heating thermal-aware scheduling according to a preferred embodiment of the present invention. This proximity heating matrix 230 may be generated from the same information collected for the variability table 220 or collected in substantially the same way. Proximity heating matrix 230 entries substantially parallel variability table 220, except that temperature entries characterize the average and maximum temperature difference of one core to another. The proximity heating matrix 230 is useful where cores/processing units are in close proximity of each other, i.e., next to or on top of one another. In such a situation, running a hot task or tasks on one core can increase the temperatures on other adjacent cores. Thus, it may be necessary consider proximity heating during thermal-aware scheduling. CMP heat-balancing (138-140 in FIG. 2), for example, may also leverage proximity information and how heating one core affects other units within or surrounding it. By considering proximity heating hot tasks may be scheduled for cores next to other cores with cold tasks or scheduling may avoid having hot tasks on adjacent cores.

Thus, the proximity heating matrix table 230 tracks how running different tasks affect adjacent core, e.g., how running tasks on core 0 causes additional heating on adjacent core 1. In user-specified core-hopping (126-130 in FIG. 2), for example, the user can specify migrating a task to other cores, i.e., not adjacent to hot cores. CMP and SMT heat-balancing (138-144 in FIG. 2), for example, may use the proximity table in considering migration and mixing groups of tasks to run, by weighting each task, using a weight for each task that depends on which core it is scheduled to run and which cores are close in proximity. Reducing the number of threads (138-144 in FIG. 2), for another example, may begin with reducing threads from cores surrounded by cores with hot tasks to, effectively, reduce peak temperatures. Also, the proximity table 230 may be combined with the variability table 220 for thermal-aware scheduling.

Advantageously, the present invention leverages spatial and temporal heat slack information in existing scheduling routines without incurring noticeable OS performance impact. Because state of the art OSs already perform task scheduling with a time granularity that is much smaller than chip thermal constants, thermal-aware scheduling may be accomplished by piggybacking thermal mitigation on these techniques. By performing thermal-aware scheduling, preferred microprocessors avoid overheating to the point of functional failure or triggering of DTMs that significantly throttle back performance.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of managing task execution on an integrated circuit chip having a plurality of processing units, said method comprising the steps of:
   a) monitoring temperature in each of said processing units;
   b) identifying thermal slack and each occurrence of a temperature indicating a hot spot in said processing units, the hot spot indication indicating that a hot spot is developing or has developed; and
   c) thermally balancing task execution amongst said plurality of processing units responsive to each identified occurrence and to said thermal slack.

2. A method as in claim 1, wherein the step (a) of monitoring temperature further comprises identifying each task in each of said processing units and a respective task temperature.

3. A method as in claim 2, wherein the step (a) of monitoring temperature comprises generating a variability matrix and a proximity heating matrix from collected task temperatures.

4. A method as in claim 2, wherein upon said temperature indicating a hot spot is forming, the step (c) of thermally balancing task execution comprises Simultaneous Multi-Threading (SMT) heat balancing, wherein task execution is rearranged to reduce the probability of hot tasks executing simultaneously in adjacent said processing units, thereby forming thermal slack sources in said adjacent processing units.

5. A method as in claim 4, wherein upon identifying that a hot spot is forming, the step (c) of thermally balancing task execution further comprises Chip-level MultiProcessors (CMP) heat balancing, wherein known hot tasks are moved away from hot cores to cores identified as sources of said thermal slack.

6. A method as in claim 5, wherein upon said temperature indicating a hot spot has occurred, the step (c) of thermally balancing task execution further comprises deferring execution of one or more identified said hot tasks.

7. A method as in claim 6, wherein upon identifying a hot spot has occurred, the step (c) of thermally balancing task execution further comprises migrating said one or more identified said hot tasks from a current core to a colder core identified as a source of said thermal slack.

8. A method as in claim 5, wherein upon identifying that a hot spot is forming, the step (c) of thermally balancing task execution further comprises user-specified core-hopping prior to CMP heat balancing, wherein one or more pre-selected tasks are migrated from a current core to another core.

9. A method as in claim 8, wherein user-specified core-hopping further comprises, checking whether a core hopping interval has occurred and until said core hopping interval has occurred proceeding to CMP heat balancing.

10. A method as in claim 8, wherein upon said temperature indicating a thermal emergency, the step (c) of thermally balancing task execution further comprises reducing SMT hardware threading.

11. A computer program product for managing task execution in a Simultaneous MultiThreading (SMT) processor, said computer program product comprising a computer usable medium having computer readable program code stored thereon, said computer readable program code comprising:
   computer readable program code means for collecting temperature information from sensors in each of a plurality of processing units;
   computer readable program code means for identifying from collected said temperature information thermal slack in, hot tasks executing in and hot spot indications occurring in said plurality of processing units, hot spot indications indicating that a hot spot is developing or has developed; and
   computer readable program code means for dynamically balancing task execution for thermal balance amongst said plurality of plurality of processing units responsive to collected said temperature information, including to identified thermal slack and to said hot spot temperatures.

12. A computer program product as in claim 11, wherein the computer readable program code means for monitoring temperature further comprises:
   computer readable program code means for identifying each task in each of said processing units and a respective task temperature; and
   computer readable program code means for generating variability matrix and a proximity heating matrix from collected task temperatures.

13. A computer program product as in claim 12, wherein the computer readable program code means for dynamically balancing task execution comprises computer readable program code means for Simultaneous MultiThreading (SMT) heat balancing, task execution being rearranged to reduce the probability of adjacent hot tasks executing simultaneously in adjacent said processing units, thereby causing time varying thermal slack in said adjacent processing units.

14. A computer program product as in claim 13, wherein the computer readable program code means for dynamically balancing task execution further comprises computer readable program code means for Chip-level MultiProcessors (CMP) heat balancing, known hot tasks being moved away from hot cores to cores identified as sources of said thermal slack.

15. A computer program product as in claim 14, wherein the computer readable program code means for dynamically balancing task execution further comprises computer readable program code means for deferring execution of one or more identified said hot tasks.

16. A computer program product as in claim 15, wherein the computer readable program code means for dynamically balancing task execution further comprises computer readable program code means for migrating said one or more identified said hot tasks from a current core to a colder core identified as a source of said thermal slack.

17. A computer program product as in claim 16, wherein the computer readable program code means for dynamically balancing task execution further comprises computer readable program code means for user-specified core-hopping comprising:
   computer readable program code means for selecting one or more tasks for migration;
   computer readable program code means for selecting a destination core; and
   computer readable program code means for migrating selected tasks from a current core to a destination core.

18. A computer program product as in claim 17, wherein the computer readable program code means for user-specified core-hopping further comprises computer readable program code means for checking whether a core hopping interval has occurred.

19. A computer program product as in claim 17, wherein the computer readable program code means for dynamically balancing task execution further comprises computer readable program code means for reducing SMT hardware threading.

20. A computer program product as in claim 19, wherein the computer readable program code means for dynamically balancing task execution further comprises computer readable program code means for suspending thermal balancing when collected task temperatures for all executing tasks indicate thermal slack for all of said plurality of processing units.

* * * * *